United States Patent [19]

Logan

[11] Patent Number: 5,057,346

[45] Date of Patent: Oct. 15, 1991

[54] FLOATABLE PAD WITH WEATHER PRECIPITATION COLLECTOR AND/OR REMOVABLE HOOK

[75] Inventor: William W. Logan, Lake Jackson, Tex.

[73] Assignee: The Dow Chemical Company, Midland, Mich.

[21] Appl. No.: 366,813

[22] Filed: Jun. 14, 1989

[51] Int. Cl.⁵ .......................... B32B 1/04; B32B 3/02; E04H 3/19
[52] U.S. Cl. .................................... 428/36.5; 428/100; 206/349; 220/94 A
[58] Field of Search .................... 428/365, 369.2, 100, 428/166; 294/172; 206/557, 349; 220/94 A

[56] References Cited

U.S. PATENT DOCUMENTS 4,341,304 7/1982 Diller .................................. 206/349
4,749,606 6/1988 Moore .................................. 428/166

Primary Examiner—James J. Seidleck
Assistant Examiner—Charles R. Nold

[57] ABSTRACT

A floatable pad including a pad body having an anti-climbing device such as a hook and/or side walls. The side walls extend a predetermined distance from and perpendicular to the top of said pad body forming a collection reservoir for collecting and holding weather precipitation such as rain and the like on top of said pad body.

16 Claims, 3 Drawing Sheets

FLOATABLE PAD WITH WEATHER PRECIPITATION COLLECTOR AND/OR REMOVABLE HOOK

BACKGROUND OF THE INVENTION

This invention relates to a novel floatable pad having a means for collecting and holding weather precipitation such as rain, snow, sleet, hail and the like thereon.

U.S. Pat. No. 4,749,606 describes a floatable pad a plurality of which comprise a floating substantially gapless insulating cover for preventing heat loss, evaporation, etc. from a liquid, slurry, semi-liquid or the like.

The floatable pad of U.S. Pat. No. 4,749,606 includes a body of predetermined floatable material, such as a low density polyethylene, or a high density cross-linked polyethylene and the like, having a horizontal cross-sectional shape, such as hexagonal, enabling a plurality of such floating pads to engage in flat surface-to-surface contact thereby providing a substantially gapless floating insulating cover. In one embodiment of U.S. Pat. No. 4,749,606, the floatable pad includes a top and bottom layers, side walls, and a plurality of thru-posts extending between the top and bottom layers and providing structural rigidity thereto, and wherein the top and bottom layers, side walls and thru-posts cooperatively provide a plurality of dead air spaces providing additional insulation between the liquid, slurry, semi-liquid or the like and the atmosphere.

The floatable pads of the prior art have the disadvantage of not being completely stable on the top of an open-top vessel when they are subjected to the elements such as wind and rain. It has been found that the pads tend to climb on each other or overlap when turbulence occurs in the fluid contained in the vessel. Once the pads overlap, the pads are difficult to separate when the pads climb on top of each other.

In addition, when the pads are used as a covering for open-top vessels such as reservoirs, pools and ponds exposed to the atmosphere, the temperature and the contents of the reservoir are at the mercy of the weather. When it rains, for example, any chemical solution contained in the reservoir, is diluted with the amount of rainfall introduced and mixed in with the chemical. Also, precipitation is generally colder than stored liquid in a reservoir and when the precipitation mixes with the liquid, a temperature dilution also occurs and there is generally a heat loss from said vessel liquid.

It is desired to provide a floatable pad which contains walls and/or a hook for use as an anti-climbing device. It is also desired to provide a floatable pad with walls for holding precipitation to provide a more stable floating pad by weighting down the pad. Further, it is desired to provide a floatable pad which can catch the bulk of precipitation to prevent dilution of the fluid contained in a vessel.

SUMMARY OF THE INVENTION

The present invention is directed to an improved floatable pad comprising a pad body having an anti-climbing device such as a hook or side walls. The side walls advantageously extend a predetermined distance from and substantially perpendicular to or at an angle to the top of said pad body forming a collection reservoir for collecting and holding weather precipitation such as rain and the like on top of said pad body.

DETAILED DESCRIPTION OF THE PREFERRED EMBODIMENT(S)

The present invention includes an improved floatable pad for floating on top of and covering the top of a process liquor for insulating the process liquor. "Process liquor" herein means a liquid, slurry, semi-liquid, or the like on which the floatable pads are floated. The floatable pad includes a surrounding wall that catches and holds weather precipitation such as rain, snow, sleet, hail and the like (herein referred to as "rainwater"). The rainwater is held for days or possibly months until it evaporates. Any rainwater in excess of the capacity of the pad walls will simply overflow.

Figure 1:
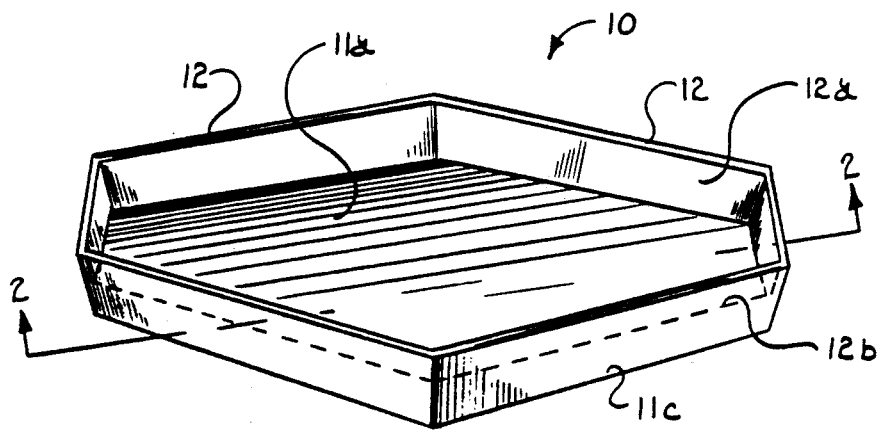
FIG. 1 is a perspective view of a floatable pad embodying the present invention and shown in hexagonal configuration.
Figure 2:
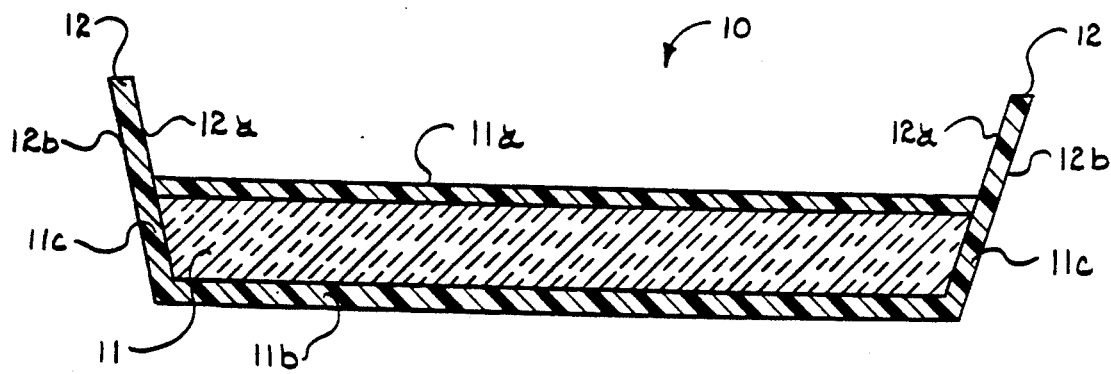
FIG. 2 is a cross-sectional view taken substantially along the line 2—2 in FIG. 1 in the direction of the arrows.

With reference to FIGS. 1 and 2, there is shown a floatable pad, generally indicated with reference numeral 10, including a body 11 having a top and bottom surface layer, 11a and 11b, respectively, and side wall 11c. The pad 10 further includes a wall member 12 having an interior wall surface 12a and an exterior wall surface 12b. A precipitation collection reservoir, herein referred to as a "rain barrel", is made up of the top 11a of the pad 10 forming the floor or base 11a of the rain barrel integral with the wall 12 which includes the interior wall surface 12a of the wall 12.

The floatable pad may be made of any weatherable material which (1) has a lower bulk density than the process liquor on which the pad floats; (2) is physically and chemically stable at the temperature of the process liquor and when in contact with the the liquor: and (3) does not have a deleterious effect on the liquor, i.e. does not contaminate the liquor or react with the liquor when in contact with the liquor. Preferably, the body 11 of the pad is made of closed-cell foamed polyethylene or other plastic such as PVC or polypropylene. The top and bottom surfaces 11a and 11b, respectively, and the side wall 11c of the pad 10 are preferably made of the same material as body 11 such as polyethylene or other plastic such as PVC or polypropylene, but the material is preferalby a non-foamed material.

Generally, the thickness of the body 11 is from about 1 to about 6 inches and preferably from about 2 to about 3 inches thick.

The wall 12 may be solid or foamed, of the same plastic. The wall 12 should be of sufficient height to collect some amount of precipitation and several inches higher than the floor. Generally, the wall is from about one inch to about four inches in height. The wall 12 is preferably from about ⅛ inch to about 1 inch thick and more preferably from ¼ inch to about ½ inch thick. The wall 12 may be at any angle sufficient to collect precipitation and in an outwardly or inwardly direction from perpendicular at from about 15 to about 20 degrees. The walls 12 preferably slope outward slightly at an angle of beyond perpendicular, preferably from about 15 degrees to about 20 degrees, to allow "nesting" for warehousing and shipping economy.

One of the benefits of a floatable pad is prevention of temperature loss from a process liquor on which the pads are floated. The rain barrel feature offers extra prevention of temperature loss because it would prevent rainwater, which is normally cooler than process liquor, from mixing with the process liquor.

In some processes, dilution of the process liquor with rainwater is undesirable. For these processes, the rain barrel feature would offer concentration benefits as well as temperature benefits.

To avoid the possibility of eventually sinking a pad: (a) the ratio of foam base thickness to rain barrel height should be relatively high ($>1.0$); or (b) the process liquor should be relatively high density ($>63$ lb/ft3), for example, when there is a probability of high-density solids getting into the rain barrel via dust in air or sloshing of the process liquor causing residue buildup in the rain barrel.

The pad base should be less dense than the process liquor and preferably, with its closed-cell foamed plastic (polyethylene) composition, can be made with a composite density of approximately 10 lb/ft$^3$ Generally, any material with a bulk density of less than 62 lb/ft$^3$ can be used. For the case of a pad with two inch thick base and four inch wall above the base, the following calculations are made for a pad floating on process liquor of density 62 lb/ft$^3$.

| Inches of Rainwater Contained | Inches of Liquor Displaced |
|---|---|
| 0 | ½ |
| 1 | 1½ |
| 2 | 2½ |
| 3 | 3½ |
| 4 (full) | 4½ |

Thus, there may still be 1½ inches of rain barrel wall above the liquor when the rain barrel is full of water. For process liquor with a density greater than 62 lb/ft$^3$, the pad could float higher than shown in the above table. The pad could also float higher if the base is made thicker than 2 inches.

The rain barrel feature should provide the stated benefits for a variety of shapes and sizes of floatable pads. For areas with substantial snowfall, the rain barrel height might be greater than one foot.

Figure 3:
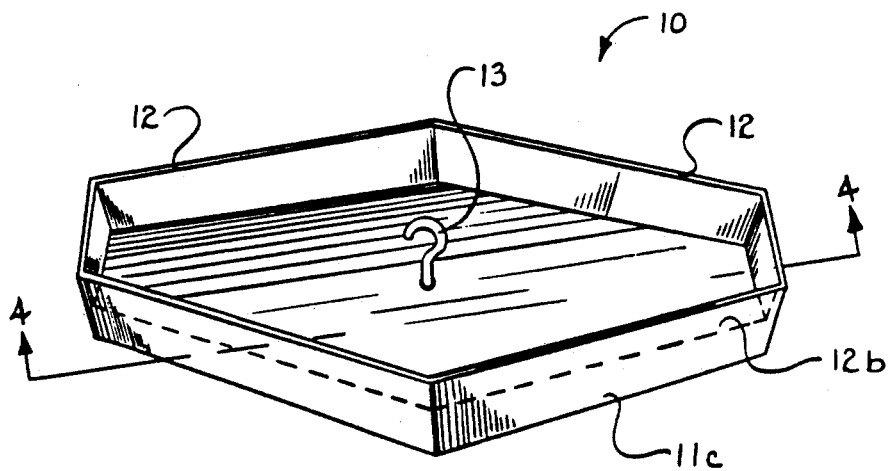
FIG. 3 is a perspective view of another embodiment of a floatable pad embodying the present invention and shown in hexagonal configuration.
Figure 4:
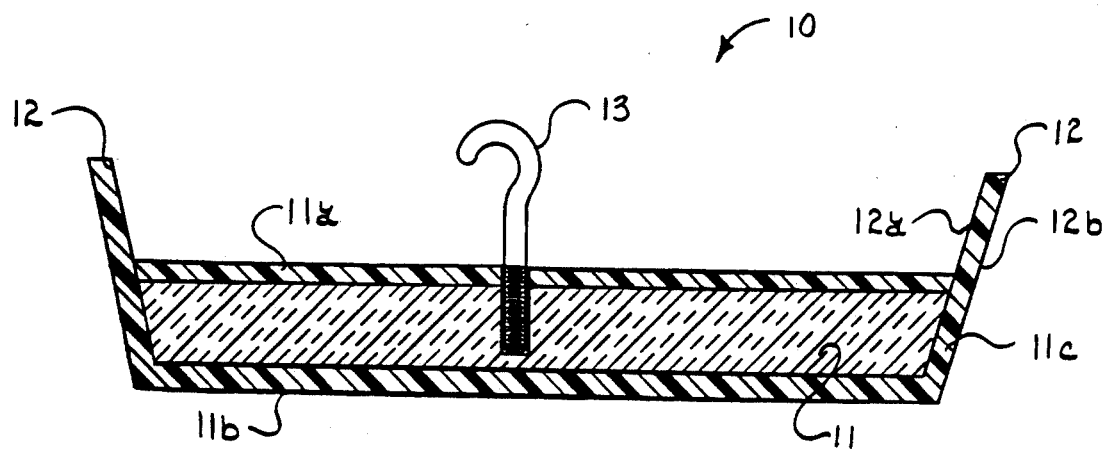
FIG. 4 is a cross-sectional view taken substantially along the line 4—4 in FIG. 3 in the direction of the arrows.

With reference to FIGS. 3 and 4, there is shown a floatable pad 10 with an eye bolt or threaded hook 13 in the center of the base 11. The bolt 13 may be removable from the base 11, for example, the hook 13 may contain threads to screw into a threaded recess in base 11. Removability of the hook preserves the nesting feature of the pad 10 for shipping and warehousing. The hook 13 adds another anti-climbing feature to the pad 10 and allows one to easily remove pads from the middle of a vessel without endangering personnel. For example, by using a pole or rope for lassoing the hook, for example from a cherry picker or overhead walkway, one can remove the pad 10 from the process liquor.

Figure 5:
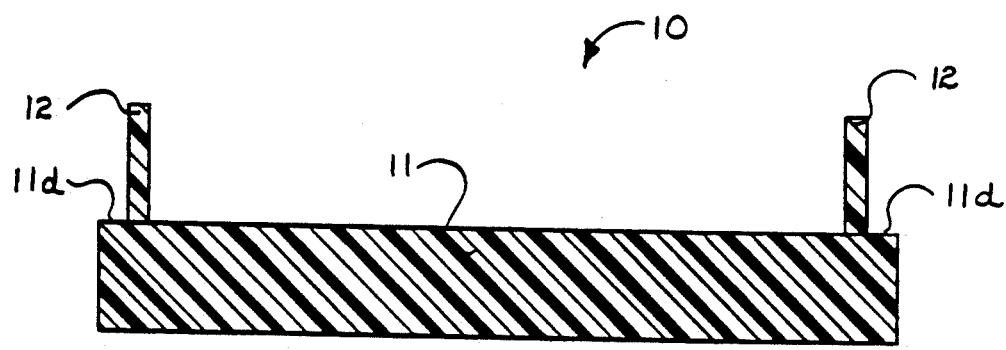
FIG. 5 is a cross-sectional view showing another embodiment of a floatable pad of the present invention.

With reference to FIG. 5, there is shown another embodiment of a floatable pad 10 with the wall 12 indented inside the edge 11d of the base 11 to provide a smaller sized and/or different shaped wall for example, a circular rain barrel if desired.

Figure 6:
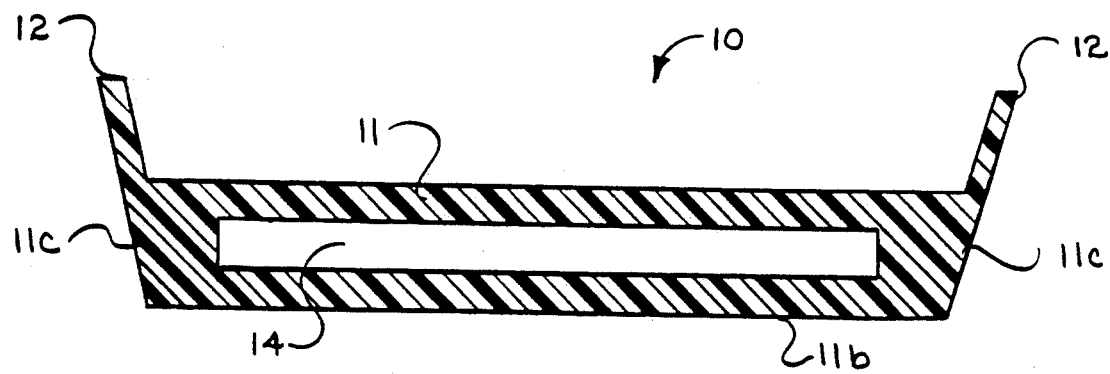
FIG. 6 is a cross-sectional view showing another embodiment of a floatable pad of the present invention.
Figure 7:
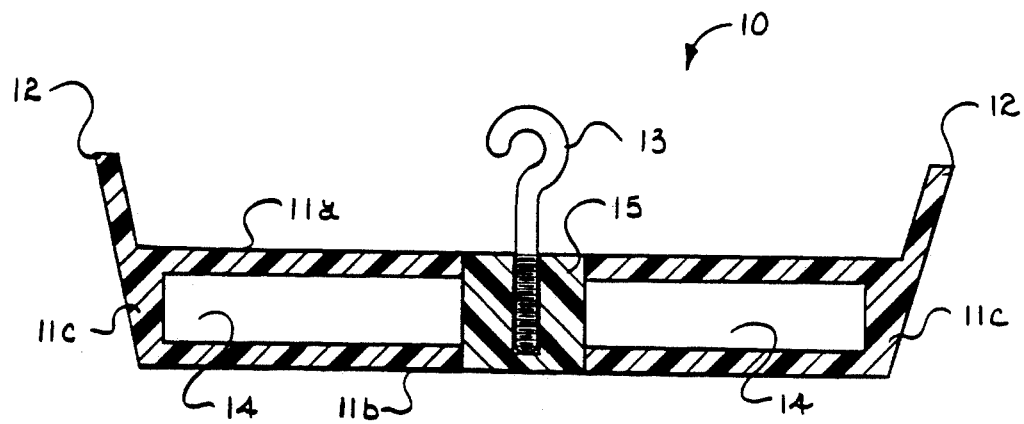
FIG. 7 is a cross-sectional view showing another embodiment of a floatable pad of the present invention.

In FIG. 6, there is shown another embodiment of a floatable pad 10 wherein the base 11 contains a hollow space 14. The advantage of this embodiment is that the hollow space provides additional insulation and bouyancy to the pad base 11. FIG. 7 shows another embodiment of the pad 10 wherein an hook 13 inserted into a solid piece 15 positioned in the center of the pad 10 for receiving the hook 13. Otherwise the pad 10 shown in FIG. 7 contains a base 11 with a hollow space 14 or a foamed interior (shown in FIG. 4) through the base 11.

Figure 8:
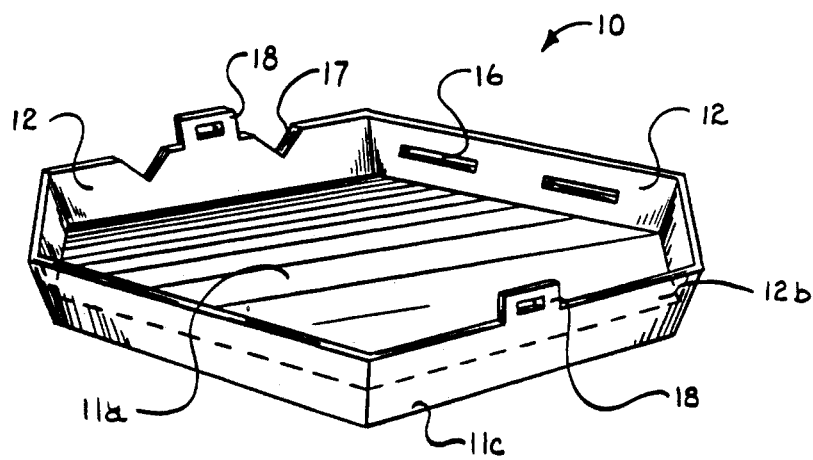
FIG. 8 is a perspective view of another embodiment of a floatable pad of the present invention and shown in hexagonal configuration.

With reference to FIG. 8, there is shown another embodiment of the floatable pad having means for limiting the level of fluid in the rain barrel such as orifices or slots 16; or notches 17 for example V-shape notches. The opening 16 or notches 17 provide a means for maintaining a level of rainwater in the rain barrel without having to fabricate a pad with a lower height wall 12. A higher wall 12 provides more resistance to climbing and overlapping of adjacent pads. The pad 10 shown in FIG. 8 contains handles 18 for carrying and handling the pads 10. Any of the embodiments of pads 10 of FIGS. 1-7 may optionally contain the handles 18 if desired.

Figure 9:
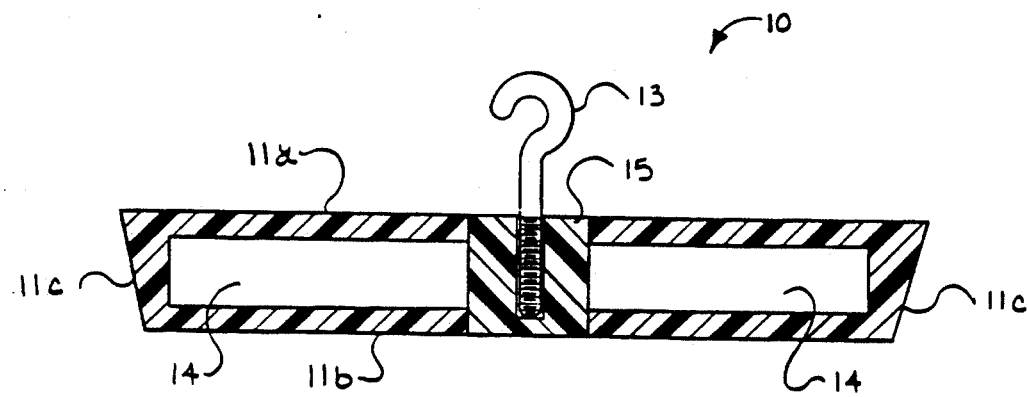
FIG. 9 is a cross-sectional view showing another embodiment of a floatable pad of the present invention.

In FIG. 9, there is shown a floatable pad 10 containing a removable hook 13 without walls 12 to serve as an anticlimbing means for preventing the pad, upon being tilted upwardly, from climbing upon an adjacent floatable pad. In addition, the hook 13 provides a means for relocating the pad 10 on the surface of the process liquor or removing the pad 10 completely from the surface of the process liquor.

EXAMPLE

To confirm that rainwater should normally evaporate in a reasonable time, the Texas Water Development Board was contacted and asked for data on evaporation rate. For the period 1971–1985, Brazoria County had an average net evaporation rate of 2.1 feet/year. This means that the evaporation rate exceeded rainfall by 2.1 feet/year. In 1979, a very high rainfall year, the net evaporation rate was only 0.75 feet for the year.

In January, 1989 a pad-with-rain-barrel was fabricated. A 0.25 inch thick by 4 inch high polyethylene wall was welded to the top of a 30 inch wide floatable pad purchased from Plastic Techniques, Inc. The rain barrel was circular with a diameter of about 27 inches.

On Jan. 31, 1989, the pad was floated in a clarifier containing 34 wt. % magnesium chloride solution with a density of approximately 84 lb/ft3 and at a temperature of approximately 60 degrees Centigrade. Potable water was poured into the rain barrel up to about 3½ inches deep. The pad was leaning or tilting to one side so that the water was 3¾ inch deep on the low side and about 3¼ inches deep on the high side. In spite of some light rainfall during the first week in February, 1989, the water in the rain barrel had completely evaporated by Feb. 10, 1989.

What is claimed is:

1. A floatable pad for providing a floating insulating cover on a process liquor comprising a hexagonally-shaped pad body having a top surface thereon and a bottom surface thereon and having side walls thereon which extend upwardly a predetermined distance from and perpendicular to the top of said pad body, or at an angle of from about 15 degrees to about 20 degrees from the perpendicular, thereby forming a collection reservoir or barrel for collecting and holding weather precipitation on top of said pad body.

2. The pad of claim 1 including a hook removably fastened to the center of the pad.

3. The pad of claim 1 wherein the walls are indented in from the edge of the pad body.

4. The pad of claim 1 wherein the pad is made of a foamed plastic material.

5. The pad of claim 1 wherein the wall contains handles.

6. The pad of claim 1 wherein the upwardly extending wall includes, openings for maintaining a maximum predetermined level of precipitation in the reservoir or barrel on top of the pad body.

7. The pad of claim 6 wherein the means for maintaining a maximum predetermined level of precipitation on top of the pad body is a notch on the wall.

8. The pad of claim 6 wherein the means for maintaining a maximum predetermined level of precipitation on top of the pad body is a slot or hole in the wall.

9. A hexagonally-shaped floatable pad for providing a floating insulating cover on a process liquor comprising a pad body having a top surface thereon and a bottom surface thereon and having walls thereon which extend upwardly walls from the top side of the pad body to form a precipitation collection reservoir or barrel, and having a removable hook extending a predetermined distance from and perpendicular to the top of said pad body, said hook adapted for preventing one adjacent floatable pad upon being tilted upwardly from climbing upon another adjacent floatable pad, said hook further adapted for repositioning on or removing from the process liquor said floatable pad.

10. The pad of claim 9 wherein the walls are indented in from the edge of the pad body.

11. The pad body of claim 9 wherein the pad is made of a foamed plastic material.

12. The pad of claim 9 wherein the wall contains handles.

13. The pad of claim 9 wherein the upwardly extending wall includes a means selected from the group consisting of notches, slots, and holes for maintaining a maximum predetermined level of precipitation in the reservoir or barrel on top of the pad body.

14. The pad of claim 9 wherein the means for maintaining a maximum predetermined level of precipitation on top of the pad body is a notch on the wall.

15. The pad of claim 9 wherein the means for maintaining a maximum predetermined level of precipitation on top of the pad body is a slot or hole in the wall.

16. The pad of claim 11 wherein the walls are at an angle of from about 15 degrees to about 20 degrees.

* * * * *

UNITED STATES PATENT AND TRADEMARK OFFICE
CERTIFICATE OF CORRECTION

PATENT NO. : 5,057,346

DATED : October 15, 1991

INVENTOR(S) : William W. Logan

It is certified that error appears in the above-identified patent and that said Letters Patent is hereby corrected as shown below:

Col. 6, line 19, change "       a means selected from the group consisting of notches, slots, and holes" to --:     openings--.

Col. 6, line 29, change "claim 11" to --claim 9--.

Signed and Sealed this

Eleventh Day of May, 1993

Attest:

MICHAEL K. KIRK

*Attesting Officer*     *Acting Commissioner of Patents and Trademarks*